(12) United States Patent
Tanaka

(10) Patent No.: US 8,526,663 B2
(45) Date of Patent: Sep. 3, 2013

(54) ELECTRONIC DEVICE

(75) Inventor: Shintaro Tanaka, Osaka (JP)

(73) Assignee: Panasonic Corporation, Osaka (JP)

( * ) Notice: Subject to any disclaimer, the term of this patent is extended or adjusted under 35 U.S.C. 154(b) by 35 days.

(21) Appl. No.: 13/253,448

(22) Filed: Oct. 5, 2011

(65) Prior Publication Data

US 2012/0087535 A1 Apr. 12, 2012

(30) Foreign Application Priority Data

Oct. 6, 2010 (JP) ................................. 2010-226833

(51) Int. Cl.
*H04R 1/02* (2006.01)

(52) U.S. Cl.
USPC ........................................................ 381/388

(58) Field of Classification Search
USPC ...... 381/386–388, 87, 332–336; 361/679.01, 361/679.02, 679.09
See application file for complete search history.

(56) References Cited

U.S. PATENT DOCUMENTS

| | | | | |
|---|---|---|---|---|
| 7,230,825 B2* | 6/2007 | Sawyer | .................... | 361/679.09 |
| 7,382,604 B2* | 6/2008 | Minaguchi et al. | ...... | 361/679.09 |
| 7,916,889 B2* | 3/2011 | Takakusaki | .................... | 381/388 |
| 8,170,266 B2* | 5/2012 | Hopkinson et al. | ........... | 381/391 |
| 2003/0024765 A1 | 2/2003 | Sugiura et al. | | |
| 2004/0240688 A1* | 12/2004 | Chiang et al. | ................. | 381/306 |
| 2006/0067557 A1* | 3/2006 | Imamura | ....................... | 381/388 |
| 2009/0168321 A1 | 7/2009 | Kataoka et al. | | |

FOREIGN PATENT DOCUMENTS

| | | |
|---|---|---|
| JP | 2003-050642 | 2/2003 |
| JP | 2004-254026 | 9/2004 |
| JP | 2009-164686 | 7/2009 |

* cited by examiner

*Primary Examiner* — Curtis Kuntz
*Assistant Examiner* — David J Ho
(74) *Attorney, Agent, or Firm* — Hamre, Schumann, Mueller & Larson, P.C.

(57) ABSTRACT

An electronic device of the present invention has a configuration in which an enclosed space is formed continuously from an opening face of a cone portion of a speaker on a reverse side of a main face of a flat housing, and an opening portion of the enclosed space is formed in a face not parallel to the main face of the housing, whereby even when a reduction in diameter of a speaker is inevitable and there is a limit to a space volume for housing the speaker due to the downsizing of the device, sound information can be reproduced with higher quality.

6 Claims, 4 Drawing Sheets

ELECTRONIC DEVICE

BACKGROUND OF THE INVENTION

1. Field of the Invention

The present invention relates to an electronic device provided with a speaker for outputting sound information.

2. Description of Related Art

Recently, downsizing of electronic devices have been advanced, and various portable electronic devices capable of displaying images using a flat display and reproducing sounds have been developed. These portable electronic devices include a thin, flat main body portion for portability, and a display panel for displaying image information is provided in the main body portion or in a display portion attached turnably to the main body portion.

In such portable electronic devices, an image display area of the display panel is required to be made as large as possible while the device itself is required to be downsized. Because of this, when the display panel is provided in a display portion of a housing that is different from the main body portion, a speaker for outputting sound information often is not arranged in the display portion, but within the main body portion in order to reduce a ratio of a so-called frame area (a size of a non-display portion) to a surface area of the housing, except a case where the application limits an arrangement position of the speaker (e.g., mobile telephones). Further, when the display panel is provided in the main body portion, the speaker often is arranged in the vicinity of the display panel within a main face of the main body portion where the display panel is arranged.

FIG. 5 shows the appearance of an information processing terminal capable of displaying image information and outputting sound information, as an example of a conventional portable electronic device.

A conventional information processing terminal 500 shown in FIG. 5 includes a terminal main body portion 501 that is thin and flat in a thickness direction and a display panel 502. Specifically, in the center of the right and left directions of a main face 501a of the terminal main body portion 501, there are the display panel 502 with a touch panel for displaying image and inputting information, and a plurality of input keys 503 for performing various operations such as ON/OFF of other power sources.

Speaker portions 504 are arranged at the right and left end portions of the main face 501a of the main body portion 501. In the example shown in FIG. 5, two each of speakers 505 are contained in the right and left speaker portions 504, whose surface portions are covered with speaker meshes. In order to correspond to the reduction in thickness of the main body portion 501, each speaker 505 is arranged such that an opening face of a cone portion is parallel to the main face 501a of the main body portion 501.

Further, in order to keep the main face 501a at an angle comfortable for a user when the information processing terminal 500 is mounted on a mounting base such as a table, a stand 506 that can fold during storage is arranged on a back face side of the terminal main body portion 501 (see JP 2003-050642 A).

In the information processing terminal 500 described in the above publication, in order to realize the reproduction of sound information with high quality while ensuring portability, the speakers 505 are used whose opening face of the cone portion has a relatively large diameter, and a large volume is allocated for the speaker portions 504 for containing the speakers 505.

However, except for electronic devices that are dedicated to reproducing music media and required to reproduce sound information with especially high quality, general portable electronic devices preferentially are required to reproduce video information in a large screen and to be downsized as a whole, as long as they can reproduce sounds with quality at a specific minimum level. Therefore, downsizing of speakers in the portable electronic devices is inevitable, which makes it difficult to increase a volume of a speaker arrangement portion just for reproducing sound information with high quality.

SUMMARY OF THE INVENTION

The present invention solves such a problem, and its object is to obtain an electronic device capable of reproducing sound information with higher quality even when, for example, a reduction in the diameter of a speaker is inevitable and there is a limit to a space volume for housing the speaker, due to a demand for downsizing the device for the purpose of ensuring portability, etc.

In order to solve the above-described problem, an electronic device of the present invention includes a flat housing that has a main face and a small thickness direction perpendicular to the main face; and a speaker that is arranged in the housing such that an opening face of a cone portion is parallel to the main face, wherein, on a reverse side of the main face, an enclosed space is formed continuously from the opening face of the cone portion of the speaker, and an opening portion of the enclosed space is formed in a face not parallel to the main face of the housing.

In the electronic device disclosed in the present application, since the opening portion of the enclosed space formed continuously from the opening face of the cone portion of the speaker is formed in a face not parallel to the main face of the housing, sound waves emitted from the speaker are not emitted directly to the outside of the housing, but reflected effectively inside the enclosed space, whereby resonance can be obtained. Therefore, even when a speaker is arranged in a limited space inside a thin flat housing and the opening face of the cone portion is arranged in a direction parallel to the main face of the housing, it is possible to reproduce deep and high quality sounds.

DETAILED DESCRIPTION OF THE INVENTION

Figure 1:
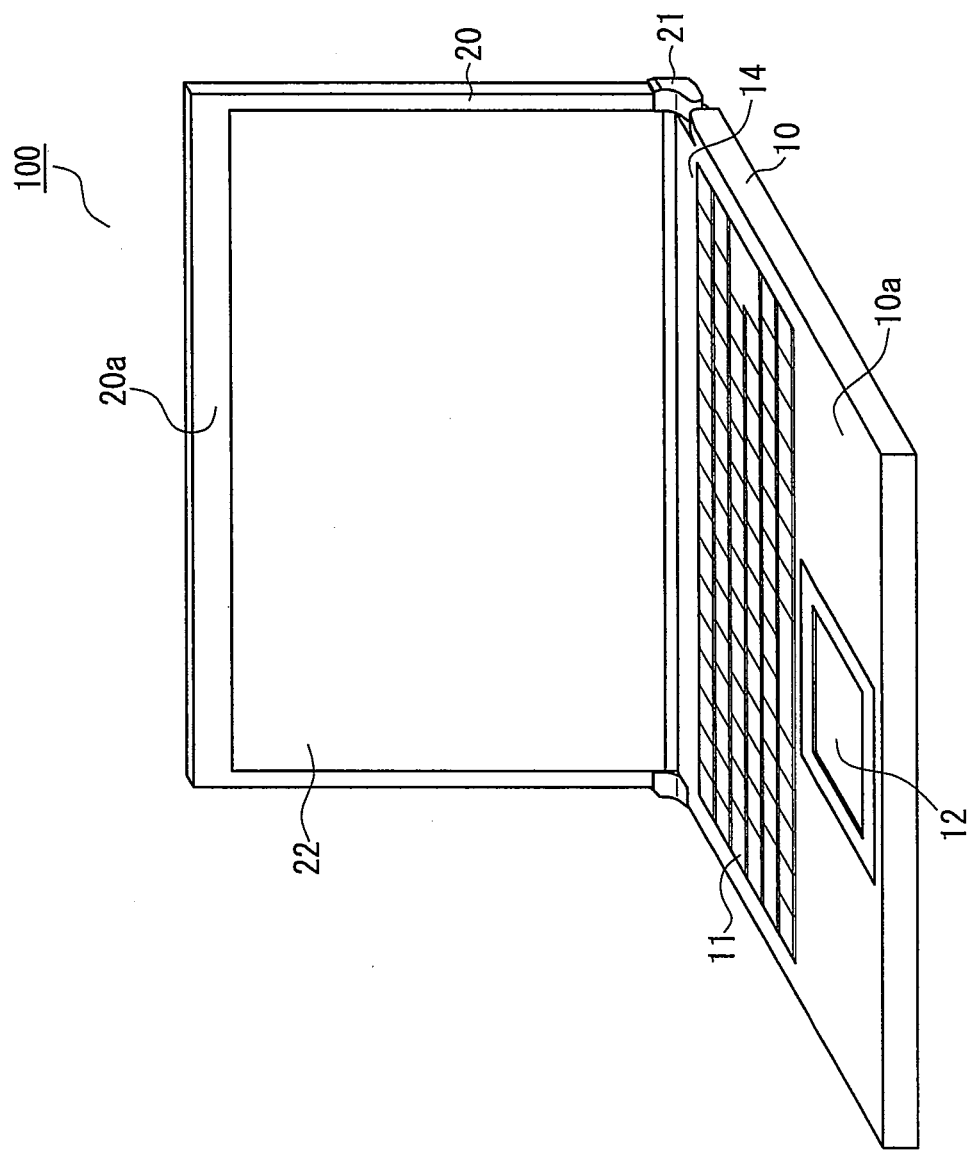
FIG. 1 is a perspective view showing the overall configuration of a notebook computer according to the present embodiment.

An electronic device disclosed in the present application includes a flat housing that has a main face and a small thickness direction perpendicular to the main face; and a speaker that is arranged in the housing such that an opening face of a cone portion is parallel to the main face. On a reverse side of the main face, an enclosed space is formed continuously from the opening face of the cone portion of the speaker, and an opening portion of the enclosed space is formed in a face not parallel to the main face of the housing.

With this configuration, most of the sound waves generated by vibration of a diaphragm contained in the cone portion of the speaker are reflected at least once inside the enclosed space and then emitted to the outside of the housing. Thus, it is possible to effectively provide thickness by resonance inside the enclosed space to the sound from the speaker arranged such that the opening face of the cone portion is parallel to the main face of the housing in the thin flat housing. Therefore, even when a speaker whose cone portion has a small opening diameter is used, it is possible to reproduce high quality sounds.

In the above-described configuration, it is preferable that a concave portion is formed in the main face, an input operation portion having an input key moveable in the thickness direction of the housing is arranged in the concave portion, and the opening portion of the enclosed space is formed in a wall face of the concave portion. With this configuration, the concave portion formed in the main face of the housing for arranging the input operation portion without increasing the thickness of the housing has a wall face that can be used as the opening portion of the enclosed space from which sounds from the speaker are emitted to the outside of the housing. Therefore, high quality sounds can be reproduced while the housing can be downsized.

Further, it is preferable that the input operation portion is a keyboard in which a plurality of input keys are arranged in a predetermined two-dimensional array. With this configuration, in the electronic device provided with a keyboard, an effective arrangement location can be obtained for the opening portion from which sounds from the speaker are emitted.

Further, it is preferable that the housing constitutes a main body portion of the electronic device containing a main circuit. Since the main body portion containing various main circuits has a relatively large capacity and stiffness, it is possible to prevent a decrease in the quality of reproduced sounds while increasing a margin of an arrangement position for the speaker.

Further, it is possible that the electronic device further includes a display portion containing a display panel, and the display portion is attached turnably to the main body portion. With this configuration, it is possible to reproduce high quality sounds while ensuring a small frame area in the display portion.

Hereinafter, modes of the electronic device disclosed in the present application will be described with reference to a notebook computer in which a keyboard is arranged on a main face of a main body portion containing a speaker, and a display portion including a display panel is attached turnably to the main body portion.

FIG. 1 is a perspective view showing an appearance of a notebook computer as an electronic device of the present embodiment.

As shown in FIG. 1, a notebook computer 100 of the present embodiment includes a main body portion 10 in which a CPU, various memories, and main circuits such as a power supply circuit and a disk drive are contained, and a display portion 20 attached turnably to the main body portion 10 by hinge portions 21.

An outline of the main body portion 10 is composed of a main face 10a and a flat housing having a small thickness in a direction perpendicular to the main face 10a. Here, the small thickness direction perpendicular to the main face 10a means that the length (thickness, height or depth) of the housing in the thickness direction, i.e., the direction perpendicular to the main face 10a, is smaller than lengths of sides constituting the main face 10a. Therefore, the main body portion 10 as a whole has a thin flat shape.

On the main face 10a of the housing constituting the main body portion 10, there are a keyboard 11 as an input operation portion in which a plurality of input keys are arranged in a predetermined two-dimensional array (for example, a JIS array), a touch pad 12 for operating a pointer, and the like.

In the notebook computer 100 of the present embodiment, on a reverse side of a portion 14 (an upper right corner of the keyboard 11 of the main face 10a seen from a user's vantage point), an enclosed space is formed so as to resonate sounds from a speaker (not shown in FIG. 1) contained in the main body portion 10. Note here that the enclosed space will be described in detail later.

In the display portion 20 attached turnably to the main body portion 10, a liquid crystal panel 22 is arranged as a display panel on a display face side 20a, which is to be opposed to the main face 10a of the housing constituting the main body portion 10 when the display portion 20 is turned on the hinge portions 21.

Note here that the notebook computer 100 of the present embodiment is a general notebook computer, and includes a disk drive, a wireless LAN antenna, a battery, various input/output terminals, a power source switch, a card slot, various circuit boards for driving these, and the like other than the above-described constituent elements; however, illustrations thereof are not shown in FIG. 1 and detailed explanations thereof are not needed. Further, the display panel to be arranged in the display portion 20 is not limited to a liquid crystal panel, and may be various flat display devices, such as an EL panel and a plasma display panel.

Figure 2:
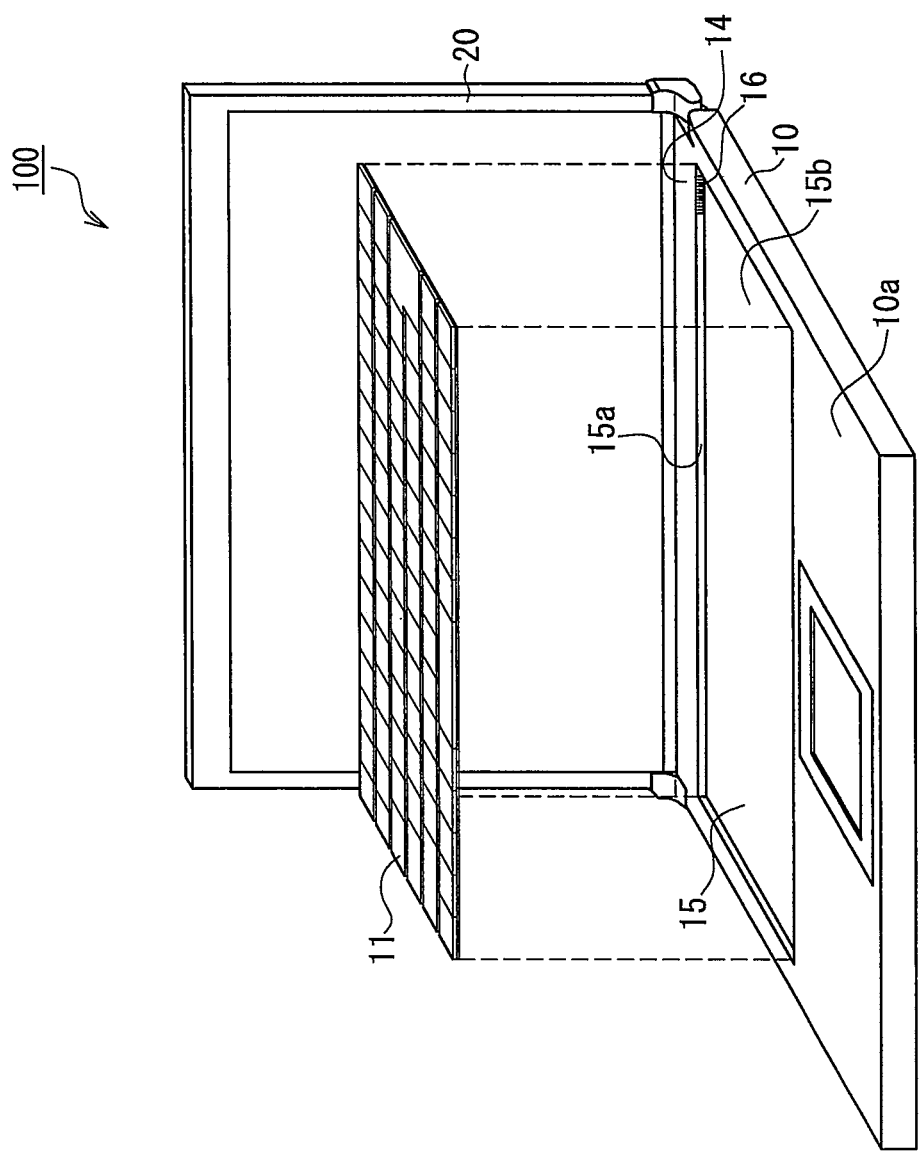
FIG. 2 is an exploded perspective view showing configurations of a keyboard and a keyboard receiving portion of the notebook computer according to the present embodiment.

FIG. 2 is an exploded perspective view showing configurations of a keyboard and a keyboard receiving portion of the notebook computer according to the present embodiment.

As shown in FIG. 2, in the notebook computer 100 of the present embodiment, a concave portion 15 is formed as a keyboard receiving portion in the main face 10a of the housing constituting the main body portion 10, so that the keyboard 11 is fitted in the concave portion 15. A pantograph structure, for example, is adopted in the keyboard 11, in which input keys are movable in a thickness direction of the main body portion 10 and information is input by detecting that respective input keys are pressed by a predetermined distance. Therefore, the keyboard 11 itself should have a predetermined thickness. For preventing the input keys from protruding significantly from the main face 10a of the housing constituting the main body portion 10 in a state where the keyboard 11 is arranged in the main face 10a of the main body portion 10, the concave portion 15 is formed in the main face 10a of the housing constituting the main body portion 10.

The concave portion 15 is composed of four wall faces and one bottom face. A side wall 15a, which is one of the four wall faces forming the concave portion 15, is a plane substantially orthogonal to the main face 10a of the housing constituting the main body portion 10 and to a bottom face 15b of the concave portion 15, and is positioned on a display portion 20 side in the concave portion 15. As described later using FIG. 4, the side wall 15a is a plane opposed to one side face of the keyboard 11. In the notebook computer 100 of the present embodiment, the enclosed space formed on the reverse side of the portion 14 of the main face 10a has an opening portion, which is formed as a slit 16 in the side wall 15a of the concave portion 15 in a longitudinal direction to the side wall 15a face, i.e., a depth direction of the concave portion 15.

Figure 3:
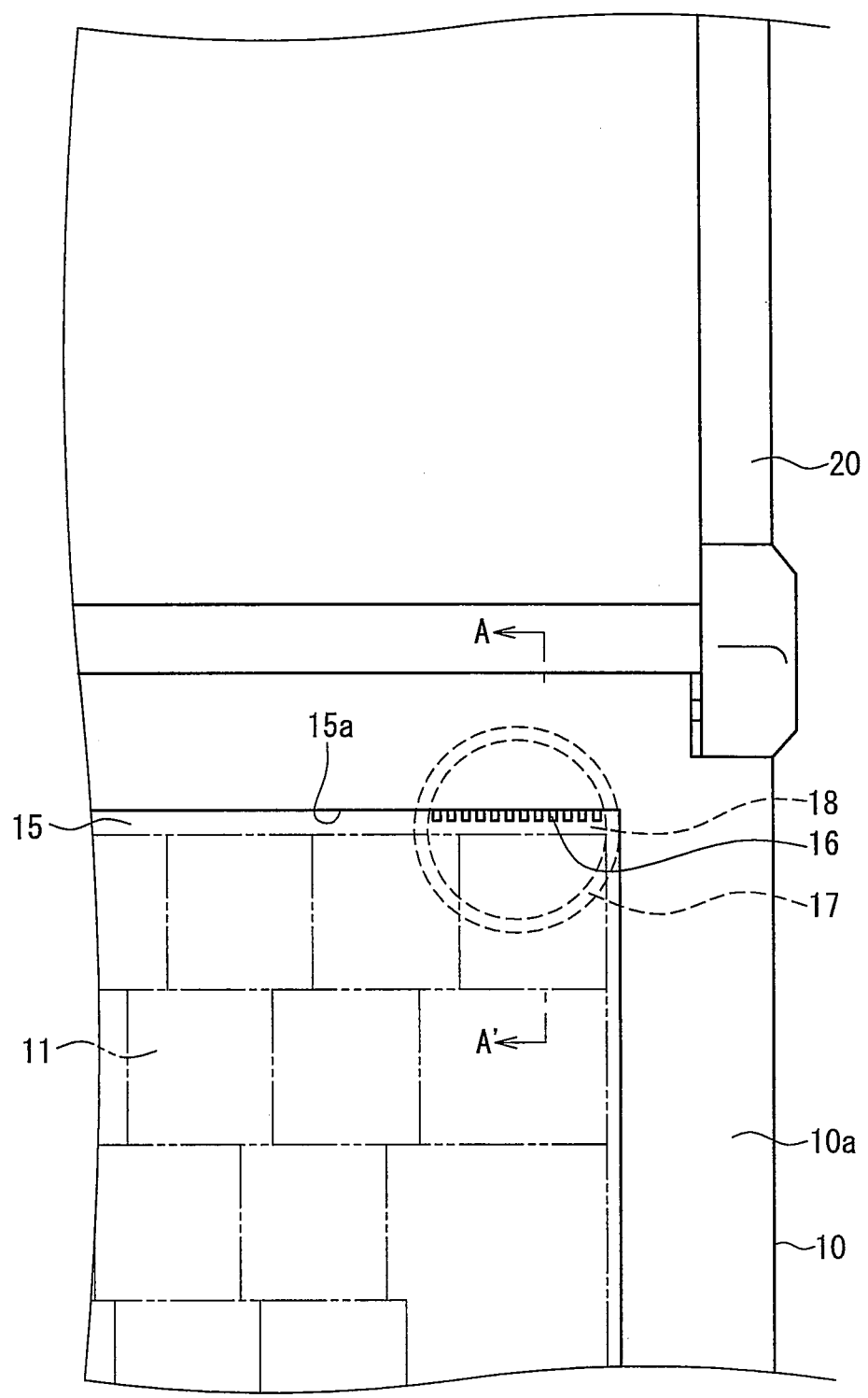
FIG. 3 is a plan view showing an opening portion of an enclosed space formed in a wall face of the keyboard receiving portion of the notebook computer according to the present embodiment.

Here, a configuration of a part in which a speaker of the notebook computer of the present embodiment is contained will be described in detail using FIGS. 3 and 4. FIG. 3 is an enlarged plan view showing a configuration in the vicinity of the upper right corner of the keyboard on the main face of the main body portion in the notebook computer of the present embodiment, seen from the user's vantage point. Further, FIG. 4 is an enlarged cross-sectional view taken along a line A-A' in FIG. 3, showing configurations of the speaker contained inside the main body portion and the periphery thereof.

Figure 4:
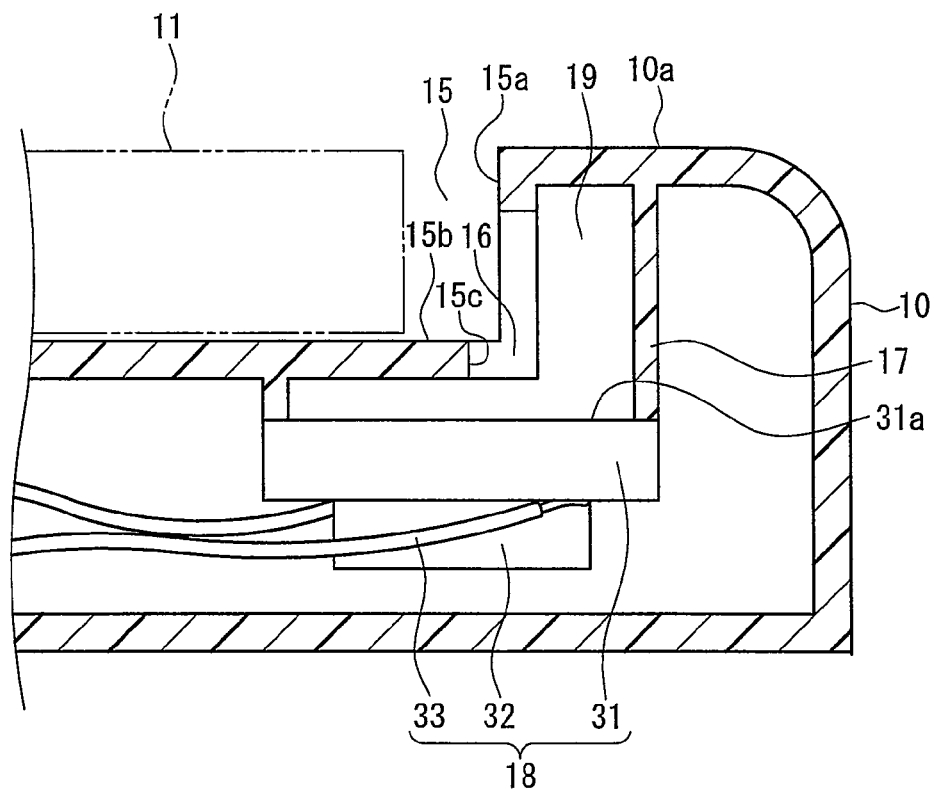
FIG. 4 is an enlarged cross-sectional view showing a main portion of the enclosed space of the notebook computer according to the present embodiment.
Figure 5:
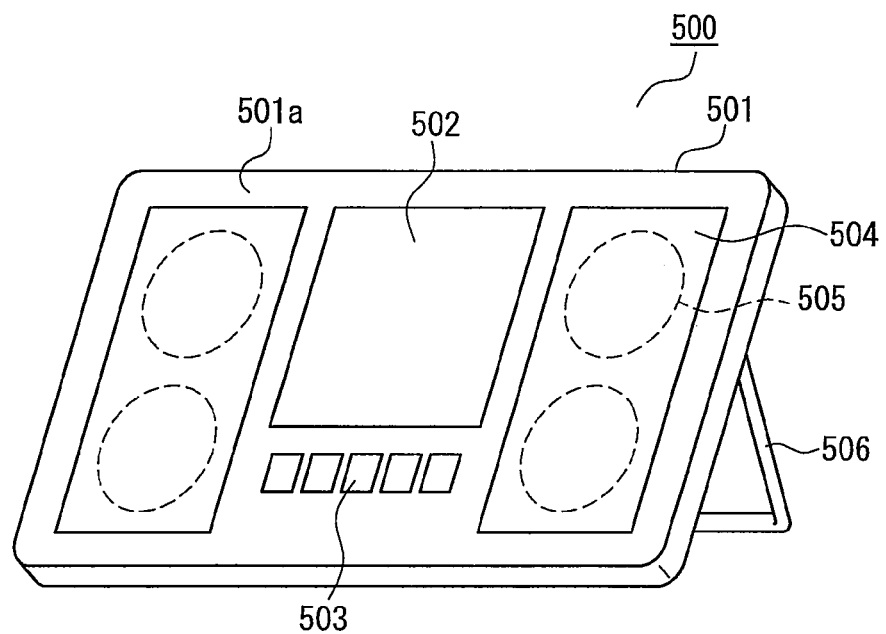
FIG. 5 is a perspective view showing an information processing terminal as a conventional portable electronic device.

As shown in FIGS. 3 and 4, in the notebook computer 100 of the present embodiment, the slit 16 that is an opening portion of an enclosed space 19 is formed in the side wall 15a of the concave portion 15, which is formed so that the keyboard 11 is embedded in the main face 10a of the housing constituting the main body portion 10.

A speaker 18 having a circular shape in a plan view as shown in FIG. 3 includes a cone portion 31 that contains a diaphragm for forming sound waves, a magnet 32 for vibrating the diaphragm, and a lead 33 for adjusting a frequency and intensity of sound waves by giving predetermined electrical signals to the magnet 32, as shown in FIG. 4. An opening face 31a of the cone portion 31 from which generated sound waves are emitted is arranged so as to be parallel to the main face 10a of the housing constituting the main body portion 10, i.e., arranged in a direction to which sounds are emitted to the upper face side of the main body portion 10.

Note here that although the speaker 18 to be equipped in the notebook computer 100 can be a magnet-type speaker as described above, it also can be a speaker that transmits electrical vibrations generated by a material having electrostrictive characteristics, such as a polyvinylidene fluoride film, to the cone portion, for further reducing the weight. Further, the planar configuration of the cone portion of the speaker is not limited to the above-described circular shape, and may be an oval shape or a square shape.

A frame portion 17 that has a circular shape in a plan view and that is formed in the same size as the opening face 31a contacts the opening face 31a of the cone portion 31 of the speaker 18. The frame portion 17 is extended from the reverse side of the main face 10a of the housing constituting the main body portion 10. In the notebook computer 100 of the present embodiment, since the speaker 18 partially is arranged at a part below the concave portion 15 that is formed in the main face 10a for receiving the keyboard 11, at the part below the concave portion 15, the frame portion 17 is formed so as to be extended from a reverse face of the bottom face 15b of the concave portion 15. A height of the frame portion 17 formed so as to be extended from the reverse face of the bottom face 15b of the concave portion 15 is lower than a height of the part of the frame portion 17 formed from the reverse face of the main face 10a.

Thus, since the front of the opening face 31a of the cone portion 31 of the speaker 18, i.e., the side to which sounds from the speaker 18 are emitted, is surrounded by the frame portion 17; and since a part opposed to the opening face 31a of the cone portion 31 of the speaker 18 is the reverse side of the main face 10a constituting the main body portion 10 or the reverse side of the bottom face 15b of the concave portion 15 formed in the main face 10a, the enclosed space 19 is formed continuously from the cone portion 31 of the speaker 18.

In the notebook computer 100 of the present embodiment, a plurality of slits 16 are formed in the side wall 15a of the concave portion 15 as the opening portion of the enclosed space 19 as shown in FIG. 4. Thereby, sound waves generated in the cone portion 31 of the speaker 18 are emitted toward the front from the opening face 31a of the cone portion 31, reflected inside the enclosed space 19, and then emitted from the slits 16 to the outside of the housing. Further, a space between one side face of the keyboard 11 and the slit 16 can be made narrower, which reduces the entrance of dusts or the like of the outside into the enclosed space 19, for example.

Thus, in the notebook computer 100 of the present embodiment, since sounds from the speaker 18 are emitted to the outside of the main body portion 10 after being reflected inside the enclosed space 19, the quality of reproduced sounds can be improved. Specifically, since the slit 16 that is the opening portion of the enclosed space 19 is formed in the side wall 15a of the concave portion 15 (formed in the main face 10a) that is substantially perpendicular to the main face 10a of the main body portion 10, most of the sound waves emitted from the cone portion 31 of the speaker 18 are not emitted directly to the outside, but emitted to the outside of the main body portion 10 after being reflected inside the enclosed space 19. Therefore, sounds to be reproduced can be deep and high quality sounds.

Note here that although in the notebook computer 100 of the present embodiment, the slit 16 that is the opening portion of the enclosed space 19 is formed from the side wall 15a of the concave portion 15 across the bottom face 15b as shown in FIG. 4, it is not essential in the notebook computer of the present embodiment that a part of the slit 16 is formed in the bottom face 15b of the concave portion 15. Although the slit 16 that is the opening portion of the enclosed space 19 should be formed in a face not parallel to the main face 10a, a part of the opening portion may be formed across the face 15b parallel to the main face 10a, as the notebook computer 100 of the present embodiment. Further, the opening portion maybe formed in the main face 10a itself.

Note here that when the opening portion of the enclosed space 19 is formed also in the main face 10a by extending the slit 16 or the like, sounds emitted from the opening face 31a of the speaker 18 via the opening portion are emitted directly to the outside of the main body portion 10. With this configuration, a phase difference is likely to occur between the sound emitted via the slit 16 after being reflected inside the enclosed space 19 and the sound emitted via the opening portion formed in the face parallel to the main face 10a, which may muddle sounds. In view of this, the arrangement position, the shape, and the number of the opening portion should be designed in consideration of the entire path of the sound to be emitted from the enclosed space 19. For example, the slit 16 of the present embodiment shown in FIG. 4 also can be designed such that the quality of sounds emitted from the opening face 31a of the speaker 18 can be optimized by forming an end face 15c, which is one end portion of the slit 16 and is opposed to the side wall 15a in the bottom face 15b of the concave portion 15, to be substantially flush with the side wall 15a.

Further, the opening portion of the enclosed space 19 is not limited to the slit shape as shown in the present embodiment, and may be formed by arranging a plurality of relatively fine openings having a circular shape, a square shape and the like. Further, by forming a rectangular opening having a relatively large area as the opening portion and covering the opening with a speaker mesh or the like, the ingress of dusts can be prevented. Further, although the face in which the opening portion of the enclosed space 19 is formed preferably is a face substantially orthogonal to the main face, it may be an inclined face inclined with respect to the main face.

Although in the notebook computer 100 of the present embodiment, an example is described in which one speaker 18 is arranged at the portion 14 (the upper right corner of the keyboard 11 of the main face 10a seen from the user), the speaker 18 may be arranged at an upper left corner, an upper center, or upper right and left sides of the keyboard 11. Further, although an example is described in which the slit 16 is formed in the side wall 15a on the upper side constituting the concave portion 15 for arranging the keyboard, the slit 16 may be formed in the other wall faces of the concave portion 15 (for example, in at least one of the right and left side walls). Further, the slit 16 may be formed from at least one of the right and left side faces across the side face 15a on the upper side. Note here that the slit 16 can be formed in a side wall on the side close to the user among the wall faces constituting the concave portion 15. However, in this case, the user may have some difficulties in listening to the sound emitted from the slit 16 because the sound travels in a direction away from the user.

Further, the face not parallel to the main face in which the opening portion of the enclosed space is formed may be a face other than the wall faces constituting the concave portion for arranging the keyboard. For example, the opening portion of the enclosed space may be formed in wall faces of an arrangement portion of a touch pad, and also in concave or convex side face portions formed on the main face for arranging various switches and operation buttons and further for the design. Furthermore, the opening portion of the enclosed space may be formed in side face portions of the housing formed substantially perpendicular to the main face of the housing constituting the main body portion.

As described above, although the present embodiment is described using the notebook computer 100 having the main body portion 10 and the display portion 20 with a display panel 21 attached turnably to the main body portion 10, this is shown merely for an illustrative purpose. The present invention may be applied to various devices, such as a portable game device, a PDA, a portable disc player, and an electronic dictionary as an electronic device having a main body portion and a display portion attached turnably to the main body portion.

Further, the present invention also may be applied to a so-called pad notebook computer in which a display panel is integrated in a main body portion, a portable mobile computer, a memory audio, and the like. Further, in the electronic device having the main body portion and the display portion attached turnably to the main body portion, it is possible to arrange a speaker not in the main body portion, but in the display portion.

The electronic device according to the present invention is useful as various electronic devices reproducing sounds by speakers, and in particular, as portable electronic devices demanded for reduction in thickness and weight of housings.

The invention may be embodied in other forms without departing from the spirit or essential characteristics thereof. The embodiments disclosed in this application are to be considered in all respects as illustrative and not limiting. The scope of the invention is indicated by the appended claims rather than by the foregoing description, and all changes which come within the meaning and range of equivalency of the claims are intended to be embraced therein.

What is claimed is:

1. An electronic device, comprising:
    a flat housing that has a main face and a small thickness direction perpendicular to the main face; and
    a speaker that is arranged in the housing such that an opening face of a cone portion is parallel to the main face,
    wherein on a reverse side of the main face, an enclosed space is formed above the opening face of the cone portion of the speaker,
    a concave portion is formed in the main face,
    an input operation portion including an input key moveable in the thickness direction of the housing is arranged in the concave portion,
    an opening portion of the enclosed space is formed in a wall face of the concave portion, and
    the opening portion of the enclosed space is formed in a face not parallel to the main face of the housing and positioned nearer to a bottom side of the housing than a key drop of the input key.

2. The electronic device according to claim 1, wherein the input operation portion is a keyboard in which a plurality of input keys are arranged in a predetermined two-dimensional array.

3. The electronic device according to claim 1, wherein the housing comprises a main body portion containing a main circuit.

4. The electronic device according to claim 3, further comprising a display portion containing a display panel, wherein the display portion is attached turnably to the main body portion.

5. The electronic device according to claim 1,
    wherein the concave portion has a side wall that is formed substantially perpendicular to the main face and a bottom face that is a face parallel to the main face surrounded by the side wall, and
    the opening portion is formed in the side wall.

6. The electronic device according to claim 5,
    wherein the side wall surrounds a left side, a right side, a front side, and a back side of the keyboard, and
    the opening portion is formed in an area of the side wall surrounding the back side of the keyboard.

* * * * *